United States Patent
Hsu et al.

(10) Patent No.: US 12,167,736 B2
(45) Date of Patent: Dec. 17, 2024

(54) CHEWING GUM COMPOSITIONS COMPRISING MULTIPLE SWEETENERS

(71) Applicant: WM. WRIGLEY JR. COMPANY, Chicago, IL (US)

(72) Inventors: Chia-Hua Hsu, Glenview, IL (US); David G. Barkalow, Deerfield, IL (US)

(73) Assignee: WM. WRIGLEY JR. COMPANY, Chicago, IL (US)

( * ) Notice: Subject to any disclaimer, the term of this patent is extended or adjusted under 35 U.S.C. 154(b) by 564 days.

(21) Appl. No.: 15/510,193

(22) PCT Filed: Sep. 9, 2015

(86) PCT No.: PCT/US2015/049113
§ 371 (c)(1),
(2) Date: Mar. 9, 2017

(87) PCT Pub. No.: WO2016/040433
PCT Pub. Date: Mar. 17, 2016

(65) Prior Publication Data
US 2017/0245521 A1    Aug. 31, 2017

Related U.S. Application Data

(60) Provisional application No. 62/049,507, filed on Sep. 12, 2014.

(51) Int. Cl.
*A23G 4/06*     (2006.01)
*A23G 4/10*     (2006.01)

(52) U.S. Cl.
CPC ............... *A23G 4/068* (2013.01); *A23G 4/10* (2013.01); *A23V 2002/00* (2013.01)

(58) Field of Classification Search
CPC ............ A23G 4/068; A23G 4/10; A23L 27/36
See application file for complete search history.

(56) References Cited

U.S. PATENT DOCUMENTS 3,795,744 A * 3/1974 Ogawa et al. ............ A23G 4/06
                                                                   426/3
4,386,106 A * 5/1983 Merritt ................... A23G 4/043
                                                                 264/4.3

(Continued)

FOREIGN PATENT DOCUMENTS

WO    WO9007859 A3    10/1990
WO    WO9103147 A3    4/1991

(Continued)

OTHER PUBLICATIONS

Fernstrom, J.D., Munger, S.D., Sclafani, A., de Araujo, I.E., Roberts, A., Molinary, S. 2012. "Mechanisms for Sweetness." J. Nutr. vol. 142, pp. 1134S-1141S.*

(Continued)

*Primary Examiner* — Katherine D LeBlanc

(57) ABSTRACT

The present disclosure is directed to chewing gum compositions having an improved sweetener release profile. More particularly, the present disclosure relates to chewing gum compositions comprising a combination of high potency sweeteners that includes at least one steviol glycoside and at least one high potency sweetener other than the steviol glycoside that does not demonstrate cross-adaptation with the steviol glycoside. When incorporated into chewing gum compositions, this combination of high potency sweeteners may be used to provide a consistent sweetness profile to the gum for extended periods of chewing.

10 Claims, 7 Drawing Sheets

(56) References Cited

U.S. PATENT DOCUMENTS

| | | | |
|---|---|---|---|
| 4,780,324 A | 10/1988 | Knebl | |
| 4,800,091 A * | 1/1989 | Glass | A23G 4/02 |
| | | | 426/3 |
| 5,227,182 A | 7/1993 | Song | |
| 5,346,998 A * | 9/1994 | Hellekant | C07K 14/43 |
| | | | 536/23.6 |
| 5,462,754 A | 10/1995 | Synosky | |
| 2005/0112236 A1* | 5/2005 | Boghani | A23G 3/0017 |
| | | | 426/5 |
| 2006/0034897 A1* | 2/2006 | Boghani | A23G 3/0017 |
| | | | 424/440 |
| 2006/0193896 A1* | 8/2006 | Boghani | A23P 10/30 |
| | | | 424/439 |
| 2006/0263413 A1* | 11/2006 | Boghani | A23G 3/54 |
| | | | 424/440 |
| 2006/0263472 A1* | 11/2006 | Boghani | A23L 27/74 |
| | | | 426/3 |
| 2006/0263473 A1* | 11/2006 | Boghani | A23G 4/20 |
| | | | 426/3 |
| 2006/0263477 A1* | 11/2006 | Boghani | A23G 4/06 |
| | | | 426/5 |
| 2006/0263478 A1* | 11/2006 | Boghani | A23G 4/06 |
| | | | 426/5 |
| 2006/0263479 A1* | 11/2006 | Boghani | A23G 4/06 |
| | | | 426/5 |
| 2006/0263480 A1* | 11/2006 | Boghani | A23G 4/20 |
| | | | 426/5 |
| 2007/0116800 A1 | 5/2007 | Prakash | |
| 2007/0298061 A1* | 12/2007 | Boghani | A23G 3/54 |
| | | | 424/401 |
| 2008/0063747 A1 | 3/2008 | Boghani et al. | |
| 2008/0145477 A1 | 6/2008 | Shen et al. | |
| 2011/0104238 A1* | 5/2011 | Haas | A23G 4/06 |
| | | | 424/440 |
| 2012/0039981 A1 | 2/2012 | Pedersen et al. | |
| 2012/0040050 A1* | 2/2012 | Lenzi | A23G 4/00 |
| | | | 426/5 |
| 2013/0216648 A1 | 8/2013 | Lenzi et al. | |

FOREIGN PATENT DOCUMENTS

| | | | | |
|---|---|---|---|---|
| WO | WO2008019685 A1 | 2/2008 | | |
| WO | 0986049 A2 | 7/2009 | | |
| WO | 2010143126 A3 | 5/2011 | | |
| WO | WO-2013003409 A1 * | 1/2013 | | A23G 4/06 |
| WO | WO-2013074762 A2 * | 5/2013 | | A23G 4/068 |

OTHER PUBLICATIONS

Hellfritsch, C., Brockhoff, A., Stahler, F., Meyerhof, W., Hofmann, T. 2012. "Human Psychometric and Taste Receptor Responses to Steviol Glycosides." J. Agric. Food Chem. vol. 60, pp. 6782-6793.*

Schiffman, S.S., Cahn, H., Lindley, M.G. 1981. "Multiple Receptor Sites Mediate Sweetness: Evidence from Cross Adaptation." Pharm. Biochem. Behav. vol. 15, pp. 377-388.*

Schiffman, S.S., Sattely-Miller, E.A., Bishay, I.E. 2007. "Time to maximum sweetness intensity of binary and ternary blends of sweeteners." Food Quality and Preference. vol. 18, pp. 405-415.*

Tan, V.W.K., Wee, M.S.M., Tomic, O., Forde, C.G. 2019. "Temporal sweetness and side tastes profiles of 16 sweeteners using temporal check-all-that-apply (TCATA)." Food Research International. vol. 121, pp. 39-47.*

Deis, R.C. 2006. "Customizing Sweetness Profiles." Food Product Design. vol. 15, No. 11, pp. 1-5.*

Commissioner KIPO, International Search Report and Opinion in PCT/US2015/049113, mailed Nov. 11, 2015, 14 pages.

Upreti et al., "Solubility Enhancement of Steviol Glycosides and Characterization of Their Inclusion Complexes with Gamma-Cyclodextrin", International Journal of Molecular Sciences, 12: 7529-7553 (2011).

* cited by examiner

CHEWING GUM COMPOSITIONS COMPRISING MULTIPLE SWEETENERS

BACKGROUND OF THE DISCLOSURE

The present disclosure is directed to chewing gum compositions having an improved sweetener release profile. More particularly, the present disclosure relates to chewing gum compositions comprising a combination of high potency sweeteners that includes at least one steviol glycoside and at least one high potency sweetener other than the steviol glycoside that does not demonstrate cross-adaptation with the steviol glycoside. When incorporated into chewing gum compositions, this combination of high potency sweeteners may be used to provide a consistent sweetness profile to the gum for extended periods of chewing.

In recent years, efforts have been devoted to controlling the release characteristics of various ingredients in chewing gum. Most notably, attempts have been made to delay the release of sweeteners and flavors in various chewing gum formulations to thereby lengthen the satisfactory chewing time of the gum. Delaying the release of sweeteners and flavors can also avoid an undesirable overpowering burst of sweetness or flavor during the initial chewing period. However, despite these efforts, many chewing gum compositions still suffer from an unacceptable decrease in perceived sweetness over extended periods of chewing.

One factor that may contribute to this decrease in perceived sweetness is sweetener adaptation. Adaptation is a phenomenon where repeated exposure to a taste stimulus results in a decrease in the magnitude of the perceived intensity of the stimulus. In the case of sweetener adaptation, it has been reported that the degree of adaptation is sweetener dependent. For instance, no significant decrease in sweetness intensity is perceived with repeated exposure to carbohydrate sweeteners, such as sucrose. In contrast, a decrease in sweetness perception tends to be greater for high potency sweeteners during repeated exposure.

One particular high potency sweetener that suffers from adaptation is rebaudioside A (Reb A). Reb A is one of the main steviol glycosides derived from the plant *Stevia rebaudiana*, and may be used as a high potency sweetener in various food products, including chewing gum. However, because Reb A demonstrates adaptation, known chewing gum compositions comprising Reb A may still have an unacceptable decrease in perceived sweetness over extended periods of chewing.

It would be desirable to minimize or avoid the decrease in perceived sweetness over extended periods of chewing that characterizes many currently available chewing gums, and to provide a chewing gum composition having a relatively consistent sweetness profile.

BRIEF DESCRIPTION OF THE DISCLOSURE

In one aspect, the present disclosure is directed to a chewing gum composition comprising: a chewing gum base; a first sweetener having a first release profile, wherein the first sweetener is a steviol glycoside; and a second sweetener having a second release profile, wherein the second sweetener is a high potency sweetener; wherein the first sweetener and the second sweetener do not demonstrate cross-adaptation; and wherein the first release profile and the second release profile provide a controlled-release profile to the chewing gum composition selected from the group consisting of sequential release of the first and second sweeteners and partially overlapping release of the first and second sweeteners.

In another aspect, the present disclosure is directed to a chewing gum composition comprising: a chewing gum base; a first sweetener having a first release profile, wherein the first sweetener is a steviol glycoside; a second sweetener having a second release profile, wherein the second sweetener is a high potency sweetener; and a third sweetener having a third release profile, wherein the third sweetener is an encapsulated high potency sweetener; wherein the first sweetener does not demonstrate cross-adaptation with the second sweetener or the third sweetener; and wherein the first release profile, the second release profile, and the third release profile provide a controlled-release profile to the chewing gum composition selected from the group consisting of (i) partially overlapping release of the first sweetener and the second sweetener and of the first sweetener and the third sweetener; (ii) sequential release of the second sweetener and the first sweetener and of the first sweetener and the third sweetener; (iii) partially overlapping release of the second sweetener and the first sweetener and sequential release of the first sweetener and the third sweetener; and (iv) sequential release of the second sweetener and the first sweetener and partially overlapping release of the first sweetener and the third sweetener.

In another aspect, the present disclosure is directed to a chewing gum composition comprising: a chewing gum base; a first sweetener, wherein the first sweetener interacts with a first taste receptor site; and a second sweetener comprising a high potency sweetener, wherein the second sweetener interacts with a second taste receptor site; wherein the first taste receptor site is different from the second taste receptor site.

DETAILED DESCRIPTION OF THE DISCLOSURE

Figure 1:
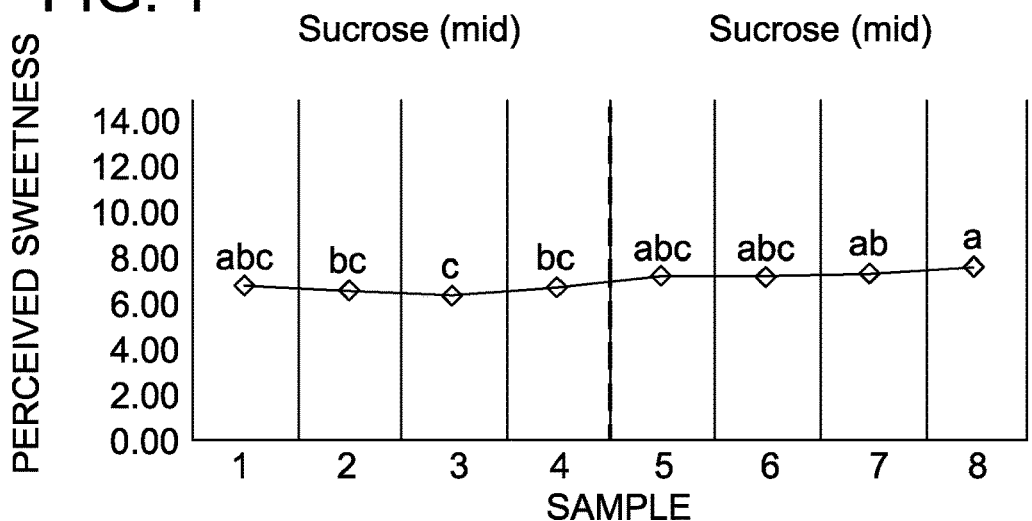
FIG. 1 is a graph showing the sweetness intensity of a 6% sucrose solution over 8 samples, as described in Examples 1-12.

The present disclosure is directed to chewing gum compositions having an improved sweetener release profile. More particularly, the present disclosure relates to chewing gum compositions comprising a combination of high potency sweeteners that includes at least one steviol glycoside and at least one high potency sweetener other than the steviol glycoside that does not demonstrate cross-adaptation with the steviol glycoside. When incorporated into chewing gum compositions, this combination of high potency sweeteners may be used to provide a consistent sweetness profile to the gum for extended periods of chewing.

Unlike many other sweet tasting food or beverage products that are rapidly consumed, chewing gum is typically maintained in the mouth of a consumer for extended periods of time, typically ranging from about 15 to about 120 minutes. In order to improve consumer enjoyment and satisfaction, it is desirable for the sweetness of the gum to last throughout the entirety of the chew time. Many chewing gum compositions, however, suffer from an unacceptable decrease in perceived sweetness over extended periods of chewing. For instance, after an initial burst of sweetness, the perceived sweetness of many gums steadily, and in some instances rapidly, declines over the course of chewing, until little to no sweetness is perceivable by the end of chewing.

Applicants have now discovered that this decrease in perceived sweetness may be minimized or avoided by including in the chewing gum composition a combination of high potency sweeteners that includes at least one steviol glycoside and at least one other high potency sweetener that does not demonstrate cross-adaptation with the steviol glycoside. Cross-adaptation is a type of adaptation wherein there is a temporary loss of sensitivity to a stimulus following exposure to a different stimulus. In the case of sweeteners, cross-adaptation between two sweeteners may occur when the perceived sweetness of one sweetener is affected by earlier exposure to a different sweetener. For example, cross-adaptation between sweeteners occurs when the perceived sweetness of a sweetener (e.g., a later released sweetener) is lower following exposure to a different sweetener (e.g., an earlier released sweetener) than it would be if exposure to the earlier released sweetener had not occurred.

By selecting sweeteners that do not demonstrate cross-adaptation for inclusion in the chewing gum compositions, the release profile of the sweeteners can be manipulated (e.g., through sweetener solubility and/or encapsulation or other controlled release techniques) so that a more consistent perception of sweetness is maintained during chewing. For instance, the release profile of the sweeteners can be manipulated so that (i) the sweeteners are released sequentially from the gum (e.g., release of one sweetener from the gum begins after release of a different sweetener is complete), (ii) the release of the sweeteners from the gum partially overlaps (e.g., release of one sweetener from the gum begins after the release of a different sweetener from the gum, but before the release of the different sweetener is complete), or (iii) the sweeteners are released from the gum according to some combination of sequential and overlapping release. Because the sweeteners do not demonstrate cross-adaptation, the consumer's sensory system will be more sensitive to the presence of the later released sweetener, and will perceive the gum to have a higher sweetness intensity upon release of this sweetener than would be the case if the later released sweetener and the earlier released sweetener demonstrated cross-adaptation. In this manner, the release from the gum of high potency sweeteners that do not demonstrate cross-adaptation may be staggered to provide the gum with a more consistent sweetness profile, and the consumer with a longer lasting sweetness perception during chewing.

Thus, in one embodiment, there is provided a chewing gum composition comprising: a chewing gum base; a first sweetener having a first release profile, wherein the first sweetener is a steviol glycoside; and a second sweetener having a second release profile, wherein the second sweetener is a high potency sweetener; wherein the first sweetener and the second sweetener do not demonstrate cross-adaptation; and wherein the first release profile and the second release profile provide a controlled-release profile to the chewing gum composition selected from the group consisting of sequential release of the first and second sweeteners and partially overlapping release of the first and second sweeteners.

In another embodiment, there is provided a chewing gum composition comprising: a chewing gum base; a first sweetener having a first release profile, wherein the first sweetener is a steviol glycoside; a second sweetener having a second release profile, wherein the second sweetener is a high potency sweetener; and a third sweetener having a third release profile, wherein the third sweetener is an encapsulated high potency sweetener; wherein the first sweetener does not demonstrate cross-adaptation with the second sweetener or the third sweetener; and wherein the first release profile, the second release profile, and the third release profile provide a controlled-release profile to the chewing gum composition selected from the group consisting of (i) partially overlapping release of the first sweetener and the second sweetener and of the first sweetener and the third sweetener; (ii) sequential release of the second sweetener and the first sweetener and of the first sweetener and the third sweetener; (iii) partially overlapping release of the second sweetener and the first sweetener and sequential release of the first sweetener and the third sweetener; and (iv) sequential release of the second sweetener and the first sweetener and partially overlapping release of the first sweetener and the third sweetener.

Although the physiological mechanism of adaptation and cross-adaptation is not completely understood, and without wishing to be bound to any particular theory, it is generally believed that it is due, at least in part, to desensitization of the sweet taste cell following activation, which results in a rapid drop in sweetness perception. More particularly, sweeteners interact and bind with receptors on taste cells, specifically, the type 1 taste receptor (T1R), which is a member of the large family of G protein-coupled receptors. The sweet receptor is composed of the T1R2 and T1R3 subunits. Although all compounds that elicit a sweet taste bind to and activate the T1R2/T1R3 receptor, not all sweeteners bind to the same site on the receptor. For instance, each T1R subunit has multiple binding sites for sweeteners. The T1R2 and T1R3 subunits are each composed of three primary domains: an extracellular venus-flytrap (VFT) domain at the N-terminus; a seven transmembrane-spanning domain (TMD) at the C terminus; and, a cysteine-rich (CYS) linker joining them. The VFT domain has a hinge region that connects two lobes (upper lobe and lower lobe). Sweeteners may bind to one or more site of the T1R2 and/or T1R3 receptor subunit. For example, brazzein binds to the CYS domain for both T1R2 and T1R3 and monellin binds to the TMD on both subunits and cyclamate bind within the TMD of T1R3 and aspartame and neotame bind to T1R2 VFT. Sweetener binding is described in more detail in Fernstrom, et al., *J. Nutrition*, (2012) Vol. 142, p. 1134S-1141S; and Masuda, et al., "Characterization of the Modes of Binding between Human Sweet Taste Receptor and Low Molecular Weight Sweet Compounds," *PLOS One*, (2012), DOI: 10.1371/journal.pone.0035380. Additionally, within each domain, there may be multiple sites with which sweeteners may interact. Such intra-domain binding is described in more detail in Zhang, et al., PNAS, (2010), Vol. 107, No. 10, pp. 4752-4757. For example, sucralose and sucrose bind to the T1R2 VFT domain near the hinge location whereas stevioside may bind to the T1R2 VFT domain near the upper lobe.

In view of the foregoing, it is further believed that by selecting sweeteners that bind to at least one different site of a taste receptor, cross-adaptation can be avoided. Thus, in another aspect, there is provided a chewing gum composition comprising: a chewing gum base; a first sweetener, wherein the first sweetener interacts with (e.g., binds to) a first taste receptor site; and a second sweetener comprising a high potency sweetener, wherein the second sweetener interacts with a second taste receptor site; wherein the first taste receptor site is different from the second taste receptor site. The first sweetener may be a nutritive or a high potency sweetener. Preferably, the first sweetener is a high potency sweetener, and more preferably is a steviol glycoside. The first taste receptor site and the second taste receptor site may be on the same taste receptor subunit (e.g., both on T1R2 or both on T1R3), or alternately, the first taste receptor site and the second taste receptor site may be on different taste receptor subunits (e.g., one on T1R2 and one on T1R3). In some embodiments, the first taste receptor site and the second taste receptor site are on the same taste receptor subunit, but on different domains of that subunit (e.g., one on the VFT and one on the TMD; one on the VFT and one on CYS; or one on the TMD and one on CYS). In other embodiments, the first taste receptor site and the second taste receptor site are on the same domain of the same taste receptor subunit (e.g., both on the VFT of T1R2), but at different locations within that domain. For example, one sweetener may bind to the VFT of T1R2 near the hinge location whereas another sweetener may bind to the VFT of T1R2 at the upper lobe. Notably, even if the steviol glycoside and the other high potency sweetener have one or more taste receptor binding site(s) in common, they may still be suitable for inclusion in the gums of the present disclosure, so long as at least one of the binding sites is different.

Sweeteners

As discussed herein, the gum compositions of the present disclosure comprise a combination of high potency sweeteners that are selected so as to avoid cross-adaptation between the sweeteners. In particular, the gum compositions comprise at least one steviol glycoside in combination with at least one high potency sweetener that is different from the steviol glycoside. Advantageously, the steviol glycoside and the high potency sweetener are selected such that they do not demonstrate cross-adaptation or such that at least one of the taste receptor binding site(s) of the steviol glycoside is different from at least one of the taste receptor binding site(s) of the high potency sweetener.

The term "steviol glycoside" refers generally to the group of sweet glycoside compounds that are derived from the plant *Stevia rebaudiana*. Two of the principal steviol glycosides that are derived from *S. rebaudiana* are rebaudioside A (Reb A) and stevioside, both of which are high potency sweeteners that are about 100 to about 500 times as sweet as sucrose. Numerous other sweet glycosides can also be extracted from *S. rebaudiana* including, but not limited to, rebaudioside B, rebaudioside C, rebaudioside D, rebaudioside E, rebaudioside F, rebaudioside M, dulcoside A, dulcoside B, rubusoside, steviolmonoside, and steviolbioside, among others. Any glycoside that may be derived from *S. rebaudiana*, or any extract of *S. rebaudiana* that comprises one or more steviol glycoside, may be used in the chewing gum compositions of the present disclosure. Preferably, the steviol glycoside used in the gum compositions of the present disclosure is Reb A.

As used herein, the term "high potency sweetener" means a substance that provides a high sweetness per unit mass as compared to a nutritive sweetener (e.g., sucrose), and that provides little to no nutritive value. High potency sweeteners are thus non-nutritive sweeteners that, on a weight-to-weight basis, are more potent than nutritive sweeteners. High potency sweeteners may include both natural and artificial sweeteners. Although steviol glycosides, such as Reb A, are high potency sweeteners, since the high potency sweetener included in the sweetener combination disclosed herein is selected such that it does not demonstrate cross-adaptation with the steviol glycoside or binds to at least one different taste receptor site than the steviol glycoside, for purposes of the present disclosure, the high potency sweetener included in the sweetener combination will necessarily be other than the steviol glycoside. This does not, however, preclude the inclusion of more than one type of steviol glycoside in the gum compositions of the present disclosure, so long as at least one high potency sweetener included in the gum composition meets the cross-adaptation or taste receptor binding site requirements set forth herein.

Examples of high potency sweeteners are well known in the nutritional arts, and include, but are not limited to: L-aspartic acid derived sweeteners, such as aspartame, alitame, and neotame; acesulfame (e.g., acesulfame-K); brazzein; cyclamic acid; dihydrochalcones; monatin; extract of *Dioscorophyllum cumminsii*; extract of the fruit of *Pentadiplandra brazzeana*; glycyrrhizin; hernandulcin; monellin; mogroside; neohesperidin; saccharin; sucralose; and extracts of sweet plants such as thaumatin; as well as salts (e.g., sodium or calcium salts) thereof. Other examples of high potency sweeteners are described in, for example, U.S.

Patent App. No. 2011/0280990, which is herein incorporated by reference. Preferably, the high potency sweetener disclosed herein is selected from the group consisting of sucralose and brazzein. More preferably, the high potency sweetener is sucralose.

Any method known in the art for evaluating the perceived sweetness of a sweetener may be used to determine whether a high potency sweetener demonstrates cross-adaptation with a steviol glycoside, such as Reb A. One exemplary method for determining whether two sweeteners demonstrate cross-adaptation is described in the examples.

The steviol glycoside and high potency sweetener may be included in the gum compositions in any amounts known in the art to be suitable for imparting sweetness to gum. The amounts of each sweetener may vary greatly and will depend on such factors as potency of the sweetener, rate of release, desired sweetness of the product, level and type of flavor used, and cost considerations. In some embodiments, the total amount of sweetener (including steviol glycoside and high potency sweetener) in the gum compositions may vary from 0.02 to about 8% by weight. When carriers used for encapsulation are included, the usage level of the encapsulated sweetener will be proportionately higher.

In one particular embodiment, the gum composition comprises the steviol glycoside in an amount of at least 0.7% by weight of the gum. The steviol glycoside may optionally be present in the gum composition in excess of the high potency sweetener. For instance, in one embodiment, the weight ratio of the steviol glycoside to the high potency sweetener may be greater than 2:1.

It should be understood that the chewing gum compositions of the present disclosure may also optionally comprise other sweeteners, including nutritive sweeteners, such as sucrose, dextrose, lactose, fructose, trehalose, tagatose, isomaltulose, glucose syrups, high fructose corn syrup, sorbitol, maltitol, mannitol, xylitol, lactitol, and the like. High potency sweeteners that do not meet the cross-adaptation and/or taste receptor binding site requirements set forth herein may also optionally be included in the gum compositions of the present disclosure, so long as at least one high potency sweetener included in the gum composition meets these requirements.

Controlled Release

In some embodiments, it may be desirable to control the release rate of one or more of the sweeteners from the gum compositions, as well as the overall release profile of the chewing gum compositions themselves, in order to provide the gum compositions with a more consistent sweetness profile, and the consumer with a longer lasting sweetness perception during chewing. For purposes of some embodiments described herein, the term "controlled-release" means that the duration or manner of release is managed or modified to some degree to provide a desired release profile. In preferred embodiments, the steviol glycoside/high potency sweetener combination disclosed herein provides the chewing gum with a controlled release profile that comprises sequential release of the sweeteners, partially overlapping release of the sweeteners, or some combination thereof.

In order to achieve these release profiles, sweeteners having different solubilities and/or release profiles may be combined to provide gum compositions with the desired release profile. For instance, in some embodiments, sweeteners that have not been modified to control their release (sometimes referred to herein as "free" or "neat" sweeteners) may be included in the gum compositions of the present disclosure. Sweeteners are known to have varying solubilities in water. For instance, although some sweeteners are water-soluble, i.e., capable of being substantially or completely dissolvable in water, others exhibit poor or no solubility in water. The solubility of the sweetener may thus be taken into consideration in designing a release profile for the gum, especially if the sweetener is to be included in the gum composition in free form.

In one particular embodiment, the steviol glycoside and the high potency sweetener are both included in the gum composition in free form. Depending on the release profile of the sweeteners, the steviol glycoside may be released from the gum prior to the high potency sweetener, or alternately, the high potency sweetener may be released from the gum prior to the steviol glycoside.

In some embodiments, controlled-release properties may be imparted to the sweeteners described herein by any suitable technique known in the art, including, but not limited to, encapsulation. More particularly, encapsulation may be used to impart a variety of release profiles to the sweeteners, including: delayed onset of release; pulsed release; gradual release; high initial release; sustained release; and combinations thereof. Thus, in some embodiments, the steviol glycoside(s) and/or high potency sweetener(s) may be encapsulated to control the rate of release of the steviol glycoside and/or high potency sweetener from the gum composition. For example, in some preferred embodiments, sucralose may be used in its encapsulated form.

Thus, in some instances, the gum compositions of the present disclosure may comprise at least one encapsulated high potency sweetener and at least one steviol glycoside, i.e., in its free form. Other embodiments may include at least one unencapsulated high potency sweetener and at least one encapsulated steviol glycoside. Further, in some embodiments, both the steviol glycoside(s) and high potency sweetener(s) may be encapsulated. In such embodiments, the high potency sweetener(s) and steviol glycoside(s) may be encapsulated together or separately. In embodiments in which the high potency sweetener(s) and steviol glycoside(s) are encapsulated separately, the material used to encapsulate the components may be the same or different. Furthermore, in any of these embodiments, more than one material may be used to encapsulate the high potency sweetener(s) or the steviol glycoside(s). Depending on the desired release profile, the high potency sweetener may release prior to or after the steviol glycoside, preferably in a sequential or partially overlapping release.

In any of the embodiments mentioned above, the encapsulated form of the high potency sweetener(s) or steviol glycoside(s) may be used in combination with an amount of the same component in its free, i.e., unencapsulated, form. By using both the free component and the encapsulated component, an enhanced perception of the sweetener may be provided over a longer period of time and/or perception of the sweetener by a consumer may be improved. For instance, some embodiments may include a high potency sweetener that is encapsulated in combination with an amount of the same high potency sweetener in its unencapsulated form. Alternatively, the unencapsulated high potency sweetener could be a different high potency sweetener from the high potency sweetener that is encapsulated. Thereby, a mixture of two different high potency sweetener may be included in some embodiments, one of which is encapsulated and the other in its free form. These variations also may be employed with respect to the steviol glycoside(s).

In one particularly preferred embodiment, the gum composition may comprise at least three sweeteners, with the first sweetener being the steviol glycoside in free form, the second sweetener being a high potency sweetener in free form, and the third sweetener being an encapsulated high potency sweetener. Preferably, the steviol glycoside is Reb A, the unencapsulated high potency sweetener is sucralose, and the encapsulated high potency sweetener is encapsulated sucralose.

Encapsulation may be effected by dispersion of the components, spray drying, spray coating, spray chilling, fluidized bed drying, absorption, adsorption, coacervation, complexation, wet granulation, wax granulation, fiber extrusion, or any other standard technique. In general, the high potency sweetener(s) and/or steviol glycoside(s) may be encapsulated by an encapsulant. For purposes of some embodiments described herein, the term "encapsulant" refers to a material that can fully or partially coat or enrobe another substance. Encapsulation is also meant to include adsorption of a substance onto another substance and the formation of agglomerates or conglomerates between two substances.

Any material conventionally used as an encapsulant in edible products may be employed. In some embodiments, for instance, it may be desirable to use an encapsulant that delays the release of the sweetener, such as, for example, a hydrophobic encapsulant. In contrast, in other embodiments, it may be desirable to increase the rate of release by using an encapsulant such as, for example, a hydrophilic material. Moreover, more than one encapsulant may be used. For example, a high potency sweetener and/or a steviol glycoside may be encapsulated by a mixture of two or more encapsulants to tailor the rate of release.

As discussed herein, sweeteners of the present disclosure are selected such that they avoid cross-adaptation and provide a fairly consistent and extended sweetness profile. In some embodiments, therefore, it may be desirable to control the release of the high potency sweetener(s) such that it is sequential with and/or partially overlaps that of the steviol glycoside(s) included in the gum composition. As discussed above, some high potency sweeteners have rapid release rates, whereas other high potency sweeteners have slower release rates. In some embodiments, the material used to encapsulate the high potency sweetener(s) may be selected to delay or increase the release rate of the sweetener(s) based on the release profiles of both the high potency sweetener(s) and steviol glycoside(s) selected for use together in the composition.

More specifically, in some embodiments, the steviol glycoside(s) contained in the composition may have a slower release profile than the high potency sweetener(s) selected for use in the same composition. It may be desirable, therefore, to include both the steviol glycoside and the high potency sweetener in the gum composition in neat form, in order to achieve a sequential or partially overlapping release. Alternately or in addition, it may be desirable to include the high potency sweetener in the gum composition in encapsulated form in order to delay the release of the high potency sweetener(s) from the composition such that it releases after the steviol glycoside, in order to provide sequential or partially overlapping release, so that there is no drop off in sweetness perception during chewing.

Suitable encapsulants for use in delayed release embodiments include, but are not limited to, polyvinyl acetate, polyethylene, crosslinked polyvinyl pyrrolidone, polymethylmethacrylate, polyacetic acid, polyhydroxyalkanoates, ethylcellulose, polyvinylacetate phthalate, methacrylic acid-co-methylmethacrylate and combinations thereof.

In some embodiments, as mentioned above, the high potency sweetener(s) may be water-soluble and release from the gum composition prior to the steviol glycoside. For example, sucralose is more water-soluble than Reb A, and releases from a gum composition prior to Reb A. As such, in some embodiments, the sucralose may be encapsulated by an encapsulant that delays the release of the sucralose, as provided above.

In other embodiments, it may be desirable to increase the release of the high potency sweetener(s) from the composition. For instance, the high potency sweetener(s) included in the composition may have a slower release rate than the steviol glycoside(s) selected for use in combination therewith. Accordingly, such high potency sweeteners may be encapsulated with an encapsulant that increases the rate of the sweetener's release. Thereby, the release of the high potency sweetener(s) and the steviol glycoside(s) may be sequential or partially overlapping during consumption.

Suitable encapsulants for use in increased release embodiments include, but are not limited to, cyclodextrins, sugar alcohols, starch, gum arabic, polyvinyl alcohol, polyacrylic acid, gelatin, guar gum, fructose and combinations thereof.

Chewing Gum Composition

As discussed above, the sweetener combinations disclosed herein may be incorporated into a chewing gum composition. The chewing gum composition may be a sugarless chewing gum, or alternately, the high potency sweetener combination may be incorporated into a sugar chewing gum to intensify and/or extend the sweetness thereof. The sweetener combinations disclosed herein may be used in either regular chewing gum or bubble gum.

A chewing gum composition typically comprises a water-soluble bulk portion, a water insoluble chewable gum base portion, and typically water-insoluble flavoring agents. The water-soluble portion dissipates with a portion of the flavoring agent over a period of time during chewing. The gum base portion is retained in the mouth throughout the chew.

The insoluble gum base may comprise elastomer components. Preferred characteristics of suitable synthetic elastomers include, for polyisobutylene, a viscosity average molecular weight of from about 100,000 to about 800,000, for styrene-butadiene, 1:1 to 1:3 bound styrene:butadiene ratio. A viscosity average molecular weight is calculated in accordance with techniques known in the art using a measurement of a polymer viscosity. Typically, a viscosity average molecular weight is closer to a weight average molecular weight than to a number average molecular weight as measured by gel permeation chromatography (GPC).

Natural elastomers useful for inclusion into chewing gum of this invention include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, and combinations thereof. The preferred synthetic elastomer and natural elastomer concentrations vary depending on whether the chewing gum in which the base is used is non-adhesive or conventional, bubble gum or regular gum, as discussed below. Preferred natural elastomers include jelutong, chicle, sorva and massaranduba balata.

A water-insoluble gum base typically constitutes approximately 5 to about 95 percent, by weight, of a chewing gum of this invention; more commonly, the gum base comprises 10 to about 50 percent of a chewing gum of this invention; and in some preferred embodiments, 20 to about 35 percent, by weight, of such a chewing gum.

A gum base useful in this invention also may include elastomer plasticizers (also called elastomer solvents), such as terpene resins and natural rosin esters, as well as other elastomer plasticizers.

Suitable elastomer plasticizers useful in this invention include, but are not limited to, natural rosin esters, often called estergums, such as glycerol esters of partially hydrogenated rosin, glycerol esters of polymerized rosin, glycerol esters of partially or fully dimerized rosin, glycerol esters of rosin, pentaerythritol esters of partially hydrogenated rosin, methyl and partially hydrogenated methyl esters of rosin, pentaerythritol esters of rosin, glycerol esters of wood rosin, glycerol esters of gum rosin; synthetics such as terpene resins derived from alpha-pinene, beta-pinene, and/or d-limonene; and any suitable combinations of the foregoing. The preferred elastomer plasticizers also will vary depending on the specific application, and on the type of elastomer which is used.

In addition to natural rosin esters, also called resins, elastomer plasticizers may include other types of plastic resins. These include polyvinyl acetate having a GPC weight average molecular weight of about 2,000 to about 90,000, polyisoprene, polyethylene, vinyl acetate-vinyl laurate copolymer having vinyl laurate content of about 5 to about 50 percent by weight of the copolymer, and combinations thereof. Preferred weight average molecular weights (by GPC) for polyisoprene are 50,000 to 80,000 and for polyvinyl acetate are 10,000 to 65,000 (with higher molecular weight polyvinyl acetates typically used in bubble gum base). For vinyl acetate-vinyl laurate, vinyl laurate content of 10-45 percent by weight of the copolymer is preferred. Preferably, a gum base contains a plastic resin in addition to other materials functioning as elastomer plasticizers.

Additionally, a gum base may include fillers/texturizers and softeners/emulsifiers. Softeners (including emulsifiers) are added to chewing gum in order to optimize the chewability and mouth feel of the gum.

Softeners/emulsifiers that typically are used include tallow, hydrogenated tallow, hydrogenated and partially hydrogenated vegetable oils, cocoa butter, mono- and di-glycerides such as glycerol monostearate, glycerol triacetate, lecithin, paraffin wax, microcrystalline wax, natural waxes and combinations thereof. Lecithin and mono- and di-glycerides also function as emulsifiers to improve compatibility of the various gum base components.

Fillers/texturizers typically are inorganic, water-insoluble powders such as magnesium and calcium carbonate, ground limestone, silicate types such as magnesium and aluminum silicate, clay, alumina, talc, titanium oxide, mono-, di- and tri-calcium phosphate and calcium sulfate. Insoluble organic fillers including cellulose polymers such as wood as well as combinations of any of these also may be used.

Selection of various components in chewing gum bases or chewing gum compositions of this disclosure typically are dictated by factors, including for example the desired properties (e.g., physical (mouthfeel), taste, odor, and the like) and/or applicable regulatory requirements (e.g., in order to have a food grade product, food grade components, such as food grade approved oils like vegetable oil, may be used.)

Colorants and whiteners may include FD&C-type dyes and lakes, fruit and vegetable extracts, titanium dioxide, and combinations thereof.

Antioxidants such as BHA, BHT, tocopherols, propyl gallate and other food acceptable antioxidants may be employed to prevent oxidation of fats, oils and elastomers in the gum base.

As noted, the base may include wax or be wax-free. An example of a wax-free gum base is disclosed in U.S. Pat. No. 5,286,500, the disclosure of which is incorporated herein by reference.

In addition to a water-insoluble gum base portion, a typical chewing gum composition includes a water-soluble bulk portion (or bulking agent) and one or more flavoring agents. The water-soluble portion can include high potency sweeteners, binders, flavoring agents, water-soluble softeners, gum emulsifiers, colorants, acidulants, fillers, antioxidants, and other components that provide desired attributes.

Water-soluble softeners, which may also known as water-soluble plasticizers and plasticizing agents, generally constitute between approximately 0.5 to about 15% by weight of the chewing gum. Water-soluble softeners may include glycerin, lecithin, and combinations thereof. Aqueous sweetener solutions such as those containing sorbitol, hydrogenated starch hydrolysates (HSH), corn syrup and combinations thereof, may also be used as softeners and binding agents (binders) in chewing gum.

Preferably, a bulking agent or bulk sweetener will be useful in chewing gums of this invention to provide sweetness, bulk and texture to the product. Typical bulking agents include sugars, sugar alcohols, and combinations thereof. Bulking agents typically constitute from about 5 to about 95% by weight of the chewing gum, more typically from about 20 to about 80% by weight and, still more typically, from about 30 to about 70% by weight of the gum. Sugar bulking agents generally include saccharide containing components commonly known in the chewing gum art, including, but not limited to, sucrose, dextrose, maltose, dextrin, dried invert sugar, fructose, levulose, galactose, corn syrup solids, and the like, alone or in combination. In sugarless gums, sugar alcohols such as sorbitol, maltitol, erythritol, isomalt, mannitol, xylitol and combinations thereof are substituted for sugar bulking agents. Combinations of sugar and sugarless bulking agents may also be used.

In addition to the above bulk sweeteners, chewing gums typically comprise a binder/softener in the form of a syrup or high-solids solution of sugars and/or sugar alcohols. In the case of sugar gums, corn syrups and other dextrose syrups (which contain dextrose and significant amounts higher saccharides) are most commonly employed. These include syrups of various DE levels including high-maltose syrups and high fructose syrups. In the case of sugarless products, solutions of sugar alcohols including sorbitol solutions and hydrogenated starch hydrolysate syrups are commonly used. Also useful are syrups such as those disclosed in U.S. Pat. No. 5,651,936 and US 2004-234648 which are incorporated herein by reference. Such syrups serve to soften the initial chew of the product, reduce crumbliness and brittleness and increase flexibility in stick and tab products. They may also control moisture gain or loss and provide a degree of sweetness depending on the particular syrup employed.

As discussed above, additional high potency artificial sweeteners can also be used in combination with the above-described sweetener combination. Preferred sweeteners include, but are not limited to sucralose, aspartame, salts of acesulfame, alitame, neotame, saccharin and its salts, cyclamic acid and its salts, glycyrrhizin, *stevia*, dihydrochalcones, thaumatin, monellin, and the like, alone or in combination. In order to provide longer lasting sweetness and flavor perception, it may be desirable to encapsulate or otherwise control the release of at least a portion of these artificial sweetener. Such techniques as described herein may be used to achieve the desired release characteristics.

Usage level of the artificial sweetener will vary greatly and will depend on such factors as potency of the sweetener, rate of release, desired sweetness of the product, level and type of flavor used and cost considerations. Thus, the active level of artificial sweetener may vary from 0.02 to about 8% by weight. When carriers used for encapsulation are included, the usage level of the encapsulated sweetener will be proportionately higher.

Combinations of sugar and/or sugarless sweeteners may be used in chewing gum. Additionally, the softener may also provide additional sweetness such as with aqueous sugar or alditol solutions.

If a low calorie gum is desired, a low caloric bulking agent can be used. Examples of low caloric bulking agents include: polydextrose; Raftilose, Raftilin; fructooligosaccharides (NutraFlora); Palatinose oligosaccharide; Guar Gum Hydrolysate (Sun Fiber); or indigestible dextrin (Fibersol). However, other low calorie bulking agents can be used. In addition, the caloric content of a chewing gum can be reduced by increasing the relative level of gum base while reducing the level of caloric sweeteners in the product. This can be done with or without an accompanying decrease in piece weight.

A variety of flavoring agents can be used. The flavor can be used in amounts of approximately 0.1 to about 15 weight percent of the gum, and preferably, about 0.2 to about 5%. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion. Sensate components which impart a perceived tingling or thermal response while chewing, such as a cooling or heating effect, also may be included. Such components include cyclic and acyclic carboxamides, menthol derivatives, and capsaicin among others. Acidulants may be included to impart tartness.

The present disclosure may be used with a variety of processes for manufacturing chewing gum, which are generally known in the art.

Chewing gum base typically is made by conventional batch mixing or continuous mixing processes. Process temperatures generally are from about 120° C. to about 180° C. in the case of a batch process. In a typical batch process, one or more elastomers are first ground or shredded along with filler followed by transferring ground or shredded elastomer to a batch mixer for compounding. Standard, commercially available mixers known in the art (e.g., a Sigma blade mixer) may be used for this purpose. During compounding, ground elastomer typically is combined with filler and elastomer plasticizer (elastomer solvent). This compounding step generally requires long mixing times (30 to 70 minutes) to produce a homogeneous mixture. Usually after compounding, additional filler and elastomer plasticizer are added followed by PVAc and finally softeners while mixing to homogeneity after each added ingredient. Minor ingredients such as antioxidants and color may be added at any time in the process. The completed base is then extruded or cast into any desirable shape (e.g., pellets, sheets or slabs) and allowed to cool and solidify. The total process time (not including the pre-grind step) is typically about 90 to 180 minutes for conventional elastomers.

Alternatively, continuous processes using mixing extruders, which are generally known in the art, may be used to prepare the gum base. In a typical continuous mixing process, initial ingredients (including ground elastomer) are metered continuously into extruder ports various points along the length of the extruder corresponding to the batch processing sequence. After the initial ingredients have massed homogeneously and have been sufficiently compounded, the balance of the base ingredients are metered into ports or injected at various points along the length of the extruder. Typically, any remainder of elastomer component or other components are added after the initial compounding stage. The composition is then further processed to produce a homogeneous mass before discharging from the extruder outlet. Typically, the transit time through the extruder will be substantially less than an hour.

Exemplary methods of extrusion, which optionally may be used in accordance with the present disclosure, include the following, the entire contents of each incorporated herein by reference: (i) U.S. Pat. No. 6,238,710 describes a method for continuous chewing gum base manufacturing, which entails compounding all ingredients in a single extruder; (ii) U.S. Pat. No. 6,086,925 discloses the manufacture of chewing gum base by adding a hard elastomer, a filler and a lubricating agent to a continuous mixer; (iii) U.S. Pat. No. 5,419,919 discloses continuous gum base manufacture using a paddle mixer by selectively feeding different ingredients at different locations on the mixer; and, (iv) U.S. Pat. No. 5,397,580 discloses continuous gum base manufacture wherein two continuous mixers are arranged in series and the blend from the first continuous mixer is continuously added to the second extruder.

Chewing gum generally is manufactured by sequentially adding the various chewing gum ingredients to commercially available mixers known in the art. After the ingredients have been thoroughly mixed, the chewing gum mass is discharged from the mixer and shaped into the desired form, such as by rolling into sheets and cutting into sticks, tabs or pellets or by extruding and cutting into chunks.

Generally, the ingredients are mixed by first melting the gum base and adding it to the running mixer. The gum base may alternatively be melted in the mixer. Color and emulsifiers may be added at this time.

A chewing gum softener such as glycerin can be added next along with part of the bulk portion. Further parts of the bulk portion may then be added to the mixer. Flavoring agents are typically added with the final part of the bulk portion.

In yet another alternative, it is possible to prepare the gum base and chewing gum in a single high-efficiency extruder as disclosed in U.S. Pat. No. 5,543,160. Chewing gums of the present disclosure may be prepared by a continuous process comprising the steps of: a) adding gum base ingredients into a high efficiency continuous mixer; b) mixing the ingredients to produce a homogeneous gum base, c) adding at least one sweetener and at least one flavor into the continuous mixer, and mixing the sweetener and flavor with the remaining ingredients to form a chewing gum product; and d) discharging the mixed chewing gum mass from the single high efficiency continuous mixer.

Many variations on the basic gum base and chewing gum mixing processes are possible. General processes for mixing gum base are known in the art and described in, for example, U.S. Patent App. No. 2009/0017160, which is herein incorporated by reference in its entirety.

EXAMPLES

The present disclosure can be further understood by reference to the following Examples. However, the Examples are provided for purposes of illustration and therefore should not be viewed in a limiting sense.

Examples 1-12

In this example, the ability of the sensory system to adjust its response sensitivity to different concentrations of the sweeteners rebaudioside A (Reb A), sucralose, and sucrose was evaluated.

10 mL sample solutions of sucralose and Reb A were prepared at either low, mid, or high concentration according to Table 1. The low concentration solutions were formulated to have a sweetness comparable to a 3 wt % sucrose solution, the mid concentration solutions were formulated to have a sweetness comparable to a 6 wt % sucrose solution, and the high concentration solutions were formulated to have a sweetness comparable to a 9 wt % sucrose solution.

TABLE 1

| Concentration | Sucralose (ppm) | Reb A (ppm) |
|---|---|---|
| Low | 47 | 90 |
| Mid | 100 | 300 |
| High | 200 | 1800 |

For comparison, mid concentration 10 mL solutions of sucrose (6 wt %) were also prepared. 10 mL solutions comprising a blend of low concentration sucralose and low concentration Reb A were also prepared.

Between 12 and 15 trained panelists were used to evaluate the sample solutions. For each test, panelists were presented with a series of eight sample solutions. The first four sample solutions (Set 1) in each series contained the same sweetener and concentration. The last four sample solutions (Set 2) in each series contained either the same sweetener and concentration as the Set 1 samples, or a different concentration and/or sweetener. Specific combinations of sweeteners and concentrations evaluated are set forth in Table 2 below:

TABLE 2

| Example | Set 1 (samples 1-4) | Set 2 (samples 5-8) |
|---|---|---|
| Control | Sucrose (mid) | Sucrose (mid) |
| 1 | Reb A (mid) | Reb A (mid) |
| 2 | Reb A (mid) | Sucrose (mid) |
| 3 | Reb A (mid) | Sucralose (mid) |
| 4 | Reb A (low) + sucralose (low) | Reb A (low) + sucralose (low) |
| 5 | Reb A (mid) | Reb A (low) |
| 6 | Reb A (mid) | Reb A (high) |
| 7 | Sucralose (mid) | Sucralose (mid) |
| 8 | Sucralose (mid) | Sucrose (mid) |
| 9 | Sucralose (mid) | Reb A (mid) |
| 10 | Sucralose (mid) | Sucralose (low) |
| 11 | Sucralose (mid) | Sucralose (high) |
| 12 | Sucrose (mid) | Reb A (mid) |

The panelists assessed the sweetness intensity of each sample on a sweetness intensity scale of 0-15, calibrated to sucrose concentration (e.g., a sweetness intensity score of 7 meant the composition had a sweetness intensity that correlated to that of a 7% sucrose solution). For each sample, the panelists took the 10 mL sample into their mouth, held the sample in the mouth for 5 seconds, and gently swirled the sample in the mouth. After 5 seconds, the sample was expectorated. The sweetness of the sample was scored within 10-15 seconds after sample intake. After a 35-40 second time delay following sweetness scoring, the process was repeated for the next sample in the series. Panelists were instructed not to cleanse their palate between the 8 samples in each series. Sweetness intensity was recorded using the Compusense 5, v.5.2 program.

The results are set forth in FIGS. 1-13. In the figures, samples sharing a letter are not statistically significantly different at a 95% confidence level. A statistical comparison of the change in the perceived sweetness score from samples 4 to 5 (i.e., from Set 1 to Set 2) is set forth below in Table 3.

TABLE 3

| Ex. | Sample 4 Sweetener (Conc.) | Sample 5 Sweetener (Conc.) | Sample 4 Sweetness Score | Sample 5 Sweetness Score | P-value | LSD | Significant? | Increase or Decrease |
|---|---|---|---|---|---|---|---|---|
| Cont | Sucrose (6 wt %) | Sucrose (6 wt %) | 6.75 | 7.27 | 2.73E−01 | 1.98 | No | |
| 1 | Reb A (mid) | Reb A (mid) | 5.48 | 5.42 | 9.00E−01 | 1.28 | No | |
| 2 | Reb A (mid) | Sucrose (mid) | 6.83 | 11.58 | 1.93E−15 | 2.7 | Yes | Increase |
| 3 | Reb A (mid) | Sucralose (mid) | 5.55 | 11.27 | 5.38E−16 | 2.63 | Yes | Increase |
| 4 | Reb A/ Sucralose (low) | Reb A/ Sucralose (low) | 5.2 | 5.03 | 7.20E−01 | 1.07 | No | |
| 5 | Reb A (mid) | Reb A (low) | 5.48 | 2.58 | 6.75E−08 | 1.19 | Yes | Decrease |
| 6 | Reb A (mid) | Reb A (high) | 7.69 | 11.3 | 1.13E−07 | 2.53 | Yes | Increase |
| 7 | Sucralose (mid) | Sucralose (mid) | 7.23 | 7.12 | 8.00E−01 | 0.91 | No | |
| 8 | Sucralose (mid) | Sucrose (mid) | 6.86 | 7.2 | 4.60E−01 | 1.61 | No | |
| 9 | Sucralose (mid) | Reb A (mid) | 5.95 | 11.39 | 3.56E−12 | 2.24 | Yes | Increase |
| 10 | Sucralose (mid) | Sucralose (low) | 5.9 | 2.36 | 7.49E−09 | 1.12 | Yes | Decrease |
| 11 | Sucralose (mid) | Sucralose (high) | 6.45 | 10.71 | 7.03E−13 | 1.55 | Yes | Increase |
| 12 | Sucrose (mid) | Reb A (mid) | 7.37 | 10.3 | 1.56E−05 | 2.18 | Yes | Increase |

Figure 2:
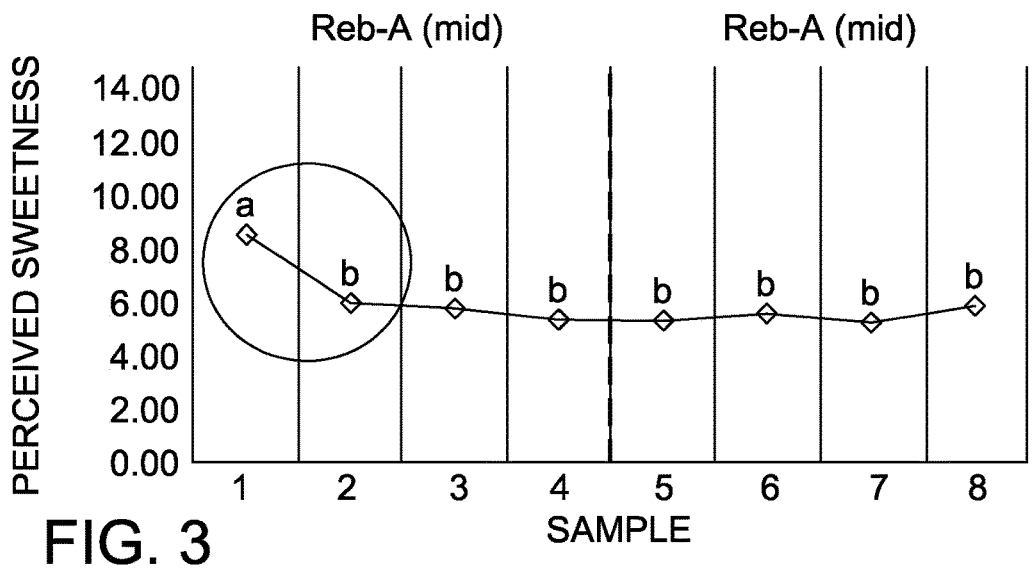
FIG. 2 is a graph showing the sweetness intensity of a mid-concentration Reb A solution over 8 samples, as described in Example 1.
Figure 3:
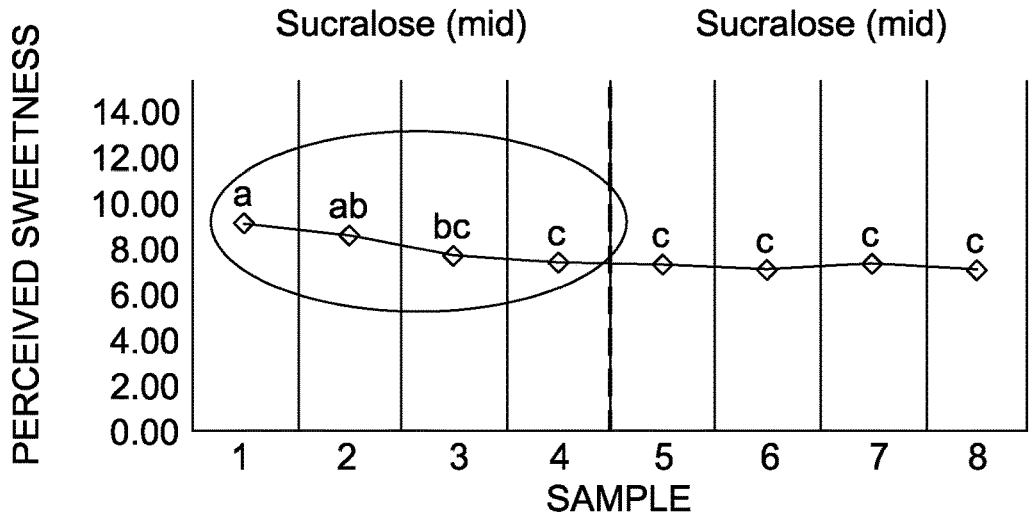
FIG. 3 is a graph showing the sweetness intensity of a mid-concentration sucralose solution over 8 samples, as described in Example 7.

Effect of Sweetener Type on Sweetness Adaptation:

FIGS. 1-3 show the change in sweetness perception of sucrose (FIG. 1), Reb A (FIG. 2), and sucralose (FIG. 3) when sweetener and sweetener concentration is kept the same for Set 1 and Set 2.

As can be seen from FIG. 1, adaptation was not seen for the sucrose control samples, as there was no statistically significant change in sweetness perception over the 8 samples tested.

In contrast, adaptation was observed for both Reb A and sucralose. As can be seen from FIG. 2, there was a statistically significant decrease in sweetness perception for Reb A between samples 1 and 2, with the sweetness perception remaining relatively constant (no significant change) for samples 2-8. As can be seen from FIG. 3, the sweetness intensity of sucralose progressively decreased over the first four samples, but did not decrease further (no significant change) for samples 5-8. These results suggest that both Reb A and sucralose demonstrate adaptation, but the type of adaptation for Reb A and sucralose is different.

Figure 4:
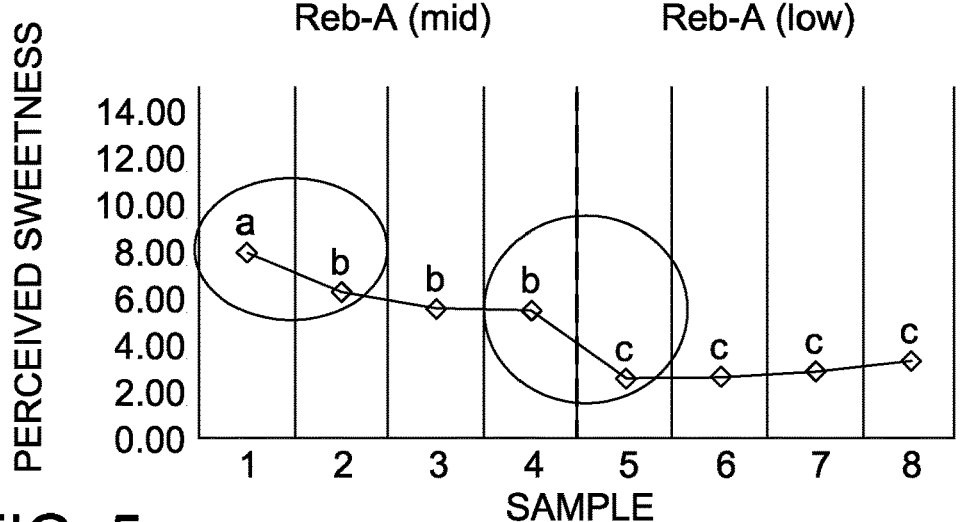
FIG. 4 is a graph showing change in sweetness intensity when switching from a mid-concentration Reb A solution to a low concentration Reb A solution, as described in Example 5.
Figure 5:
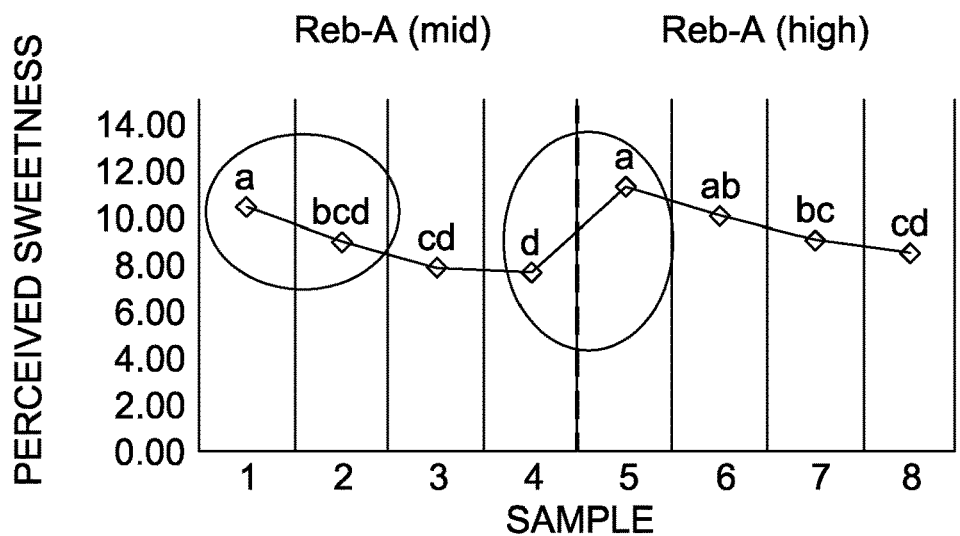
FIG. 5 is a graph showing change in sweetness intensity when switching from a mid-concentration Reb A solution to a high concentration Reb A solution, as described in Example 6.

Effect of Reb A Concentration Change on Sweetness Perception:

FIGS. 4 and 5 show the change in sweetness perception of Reb A, when Reb A concentration is either decreased (FIG. 4) or increased (FIG. 5).

As can be seen from the figures, there was a significant decrease in sweetness perception from samples 4 to 5 when switching from a mid-concentration Reb A solution to a low concentration Reb A solution (FIG. 4), and a significant increase in sweetness perception from samples 4 to 5 when switching from a mid-concentration Reb A solution to a high concentration Reb A solution (FIG. 5). These results suggest that the sensory system is able to respond, and adjust its response sensitivity, to a change in concentration of Reb A.

Notably, there was no significant change in sweetness perception (no adaptation) with the low concentration Reb A after switching from the mid-concentration to the low concentration Reb A solution (see, e.g., samples 5-8 in FIG. 4). In contrast, an adaptation effect was observed with the high concentration Reb A solution after switching from the mid-concentration to the high concentration Reb A solution (see, e.g., samples 5-8 in FIG. 5).

Figure 6:
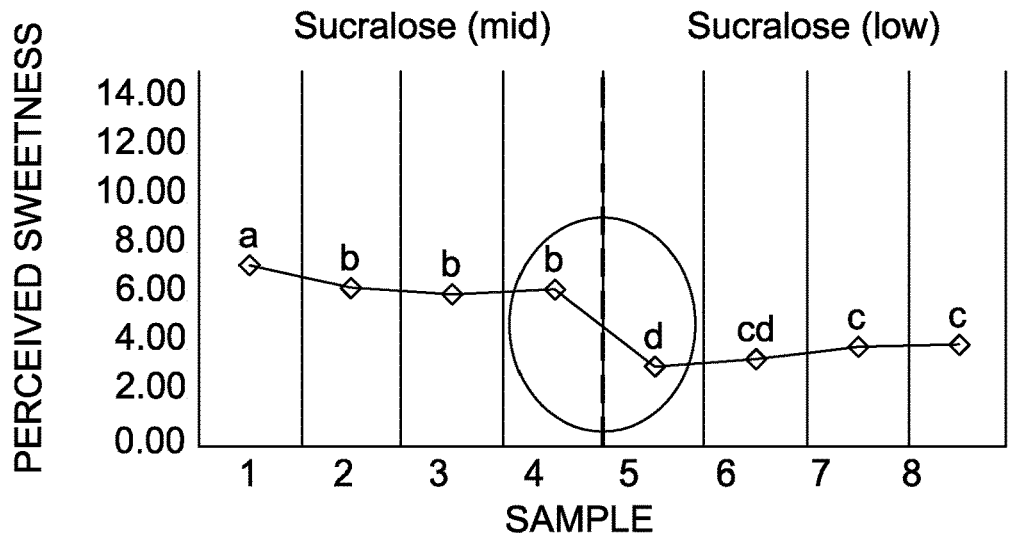
FIG. 6 is a graph showing change in sweetness intensity when switching from a mid-concentration sucralose solution to a low concentration sucralose solution, as described in Example 10.
Figure 7:
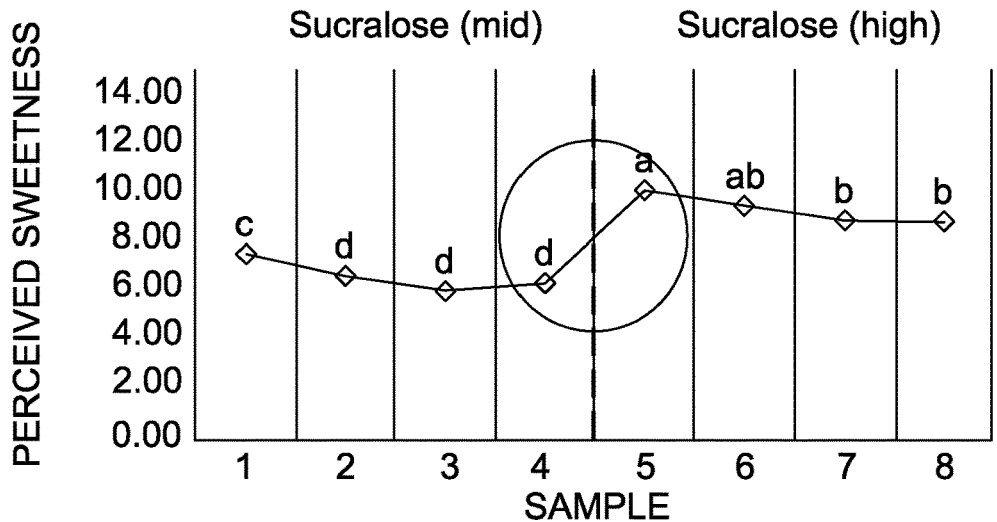
FIG. 7 is a graph showing change in sweetness intensity when switching from a mid-concentration sucralose solution to a high concentration sucralose solution, as described in Example 11.

Effect of Sucralose Concentration Change on Sweetness Perception:

FIGS. 6 and 7 show the change in sweetness perception of sucralose, when sucralose concentration is either decreased (FIG. 6) or increased (FIG. 7).

As can be seen from the figures, there was a significant decrease in sweetness perception from samples 4 to 5 when switching from a mid-concentration sucralose solution to a low concentration sucralose solution (FIG. 6), and a significant increase in sweetness perception from samples 4 to 5 when switching from a mid-concentration sucralose solution to a high concentration sucralose solution (FIG. 7). These results suggest that the sensory system is able to respond, and adjust its response sensitivity, to a change in concentration of sucralose.

Notably, there was no significant decrease in sweetness perception (no adaptation) with the low concentration sucralose solution after switching from the mid-concentration to the low concentration sucralose solution (see, e.g., samples 5-8 in FIG. 6). In contrast, an adaptation effect was observed with the high concentration sucralose solution after switching from the mid-concentration to the high concentration sucralose solution (see, e.g., samples 5-8 in FIG. 7).

Figure 8:
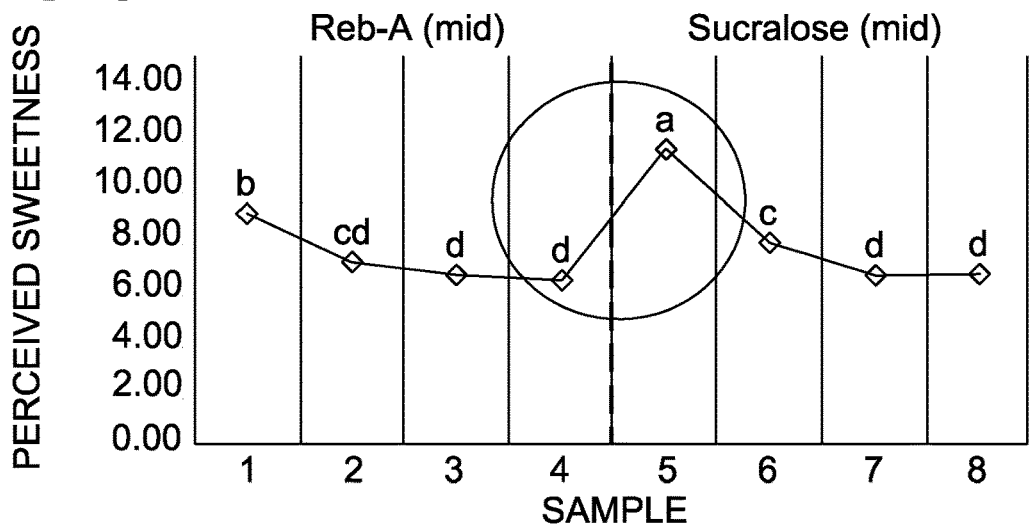
FIG. 8 is a graph showing change in sweetness intensity when switching from a mid-concentration Reb A solution to a mid-concentration sucralose solution, as described in Example 3.
Figure 9:
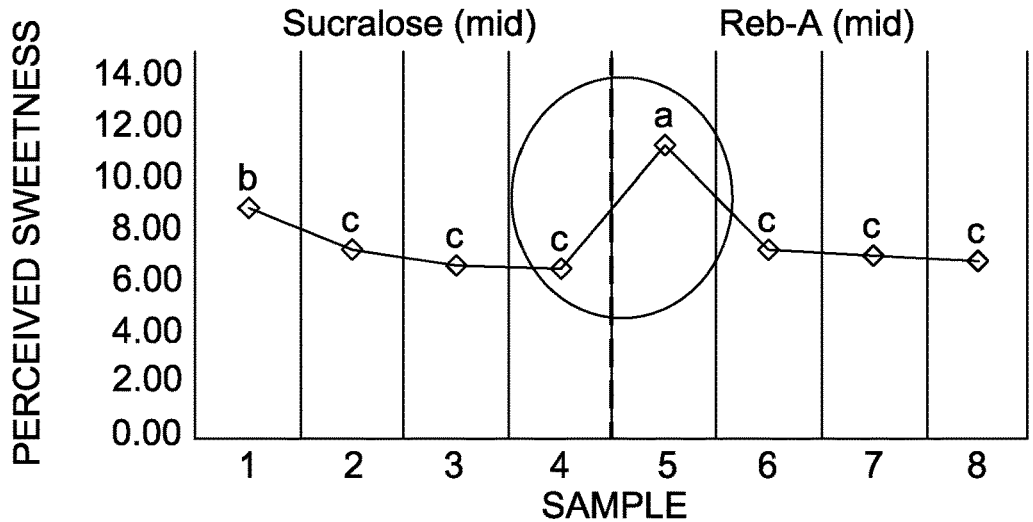
FIG. 9 is a graph showing change in sweetness intensity when switching from a mid-concentration sucralose solution to a mid-concentration Reb A solution, as described in Example 9.

Evaluation of Cross-Adaptation Between Reb A and Sucralose:

FIGS. 8 and 9 show the change in sweetness perception when switching from a Reb A solution to a sucralose solution (FIG. 8) or from a sucralose solution to a Reb A solution (FIG. 9).

As can be seen from these figures, there was a significant increase in sweetness perception from samples 4 to 5 when switching from a mid-concentration Reb A solution to a mid-concentration sucralose solution (FIG. 8) or from a mid-concentration sucralose solution to a mid-concentration Reb A solution (FIG. 9). These results suggest that that there is no cross-adaptation between Reb A and sucralose or between sucralose and Reb A, since the sensory system was able to respond, and adjust its response sensitivity, to a change in sweetener from Reb A to sucralose and from sucralose to Reb A.

Figure 10:
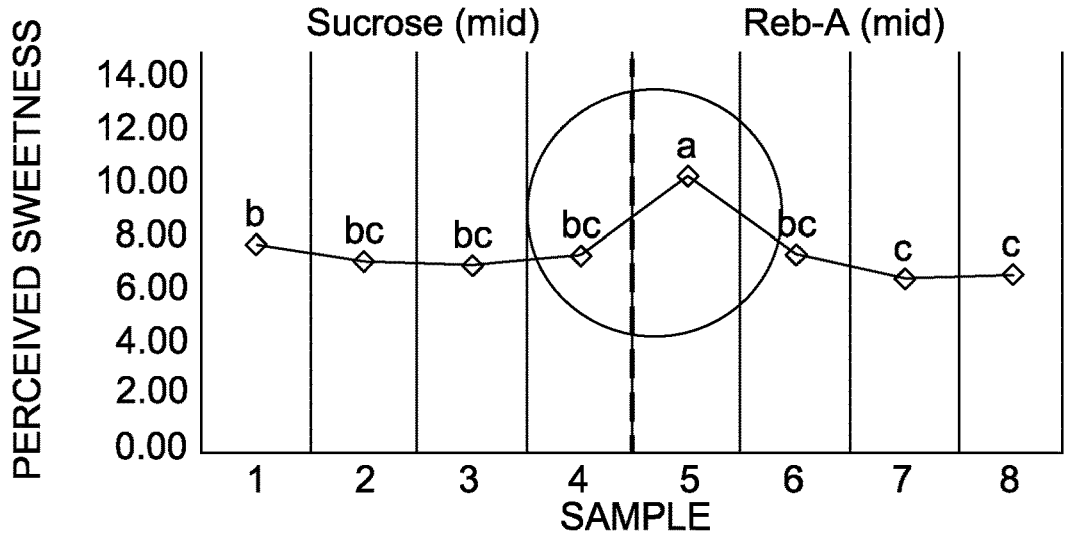
FIG. 10 is a graph showing change in sweetness intensity when switching from a 6% sucrose solution to a mid-concentration Reb A solution, as described in Example 12.
Figure 11:
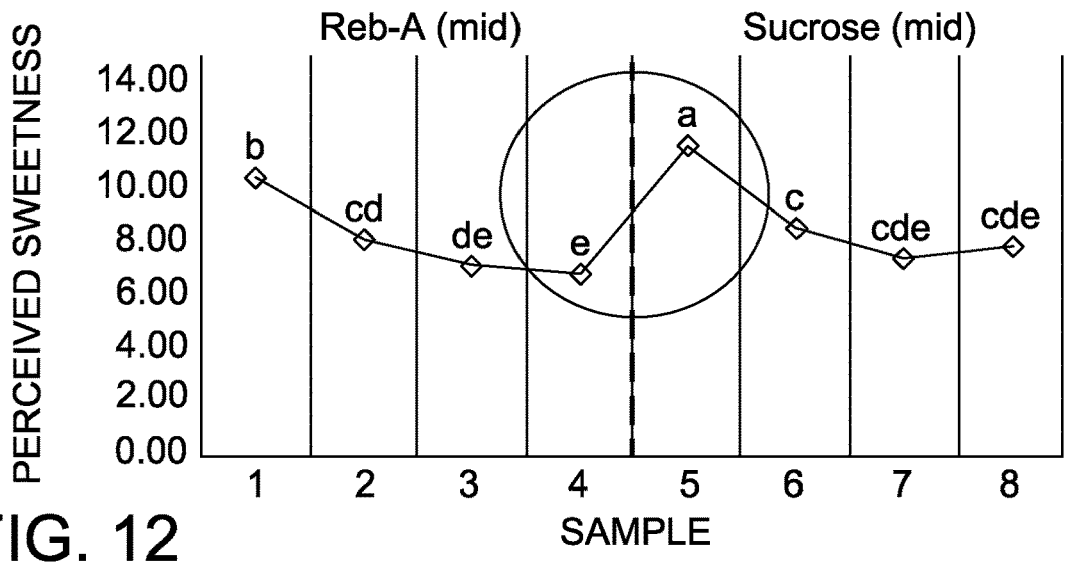
FIG. 11 is a graph showing change in sweetness intensity when switching from a mid-concentration Reb A solution to a 6% sucrose solution, as described in Example 2.
Figure 12:
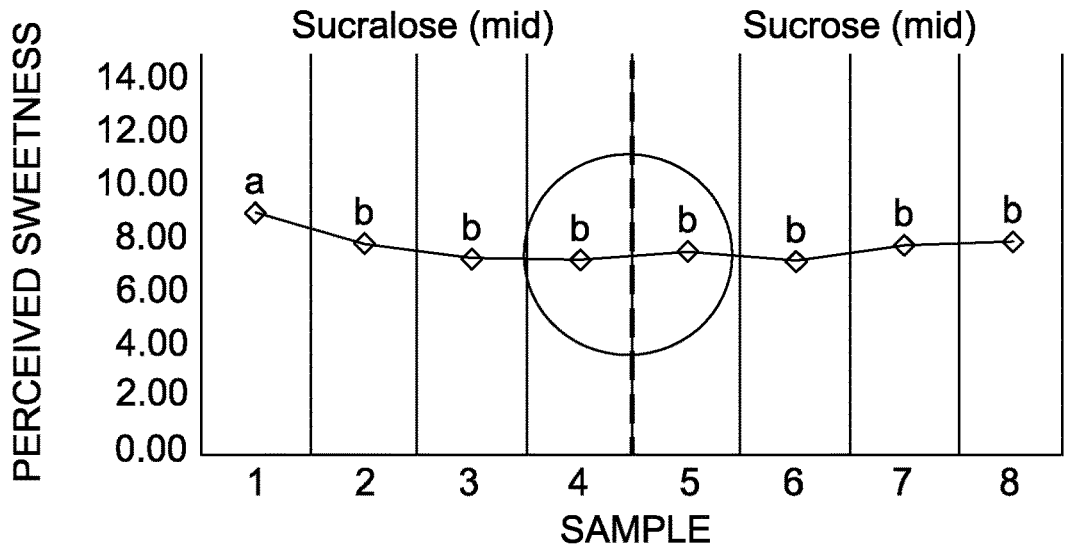
FIG. 12 is a graph showing change in sweetness intensity when switching form a mid-concentration sucralose solution to a 6% sucrose solution, as described in Example 8.

Evaluation of Cross-Adaptation Between Caloric and Non-Caloric Sweeteners:

FIGS. 10-12 show the change in sweetness perception when switching from a sucrose solution to a Reb A solution (FIG. 10), from a Reb A solution to a sucrose solution (FIG. 11), or from a sucralose solution to a sucrose solution (FIG. 12).

As can be seen from FIGS. 10 and 11, there was a significant increase in sweetness perception from samples 4 to 5 when switching from a mid-concentration sucrose solution to a mid-concentration Reb A solution (FIG. 10), or from a mid-concentration Reb A solution to a mid-concentration sucrose solution (FIG. 11). These results suggest that there is no cross-adaptation between Reb A and sucrose or between sucrose and Reb A. There was, however, no significant change in sweetness perception from samples 4 to 5 when switching from a mid-concentration sucralose solution to a mid-concentration sucrose solution (FIG. 12), suggesting that there may be cross-adaptation between sucralose and sucrose.

As can be seen from FIGS. 10 and 11, the initial sweetness perception of sucrose following Reb A consumption (FIG. 11, samples 5 and 6) was higher than the sweetness perception of sucrose when sucrose was administered prior to Reb A (FIG. 10). These results suggest that Reb A influences the sweetness perception of sucrose. Sucralose did not, however, produce a similar effect when administered prior to sucrose.

Figure 13:
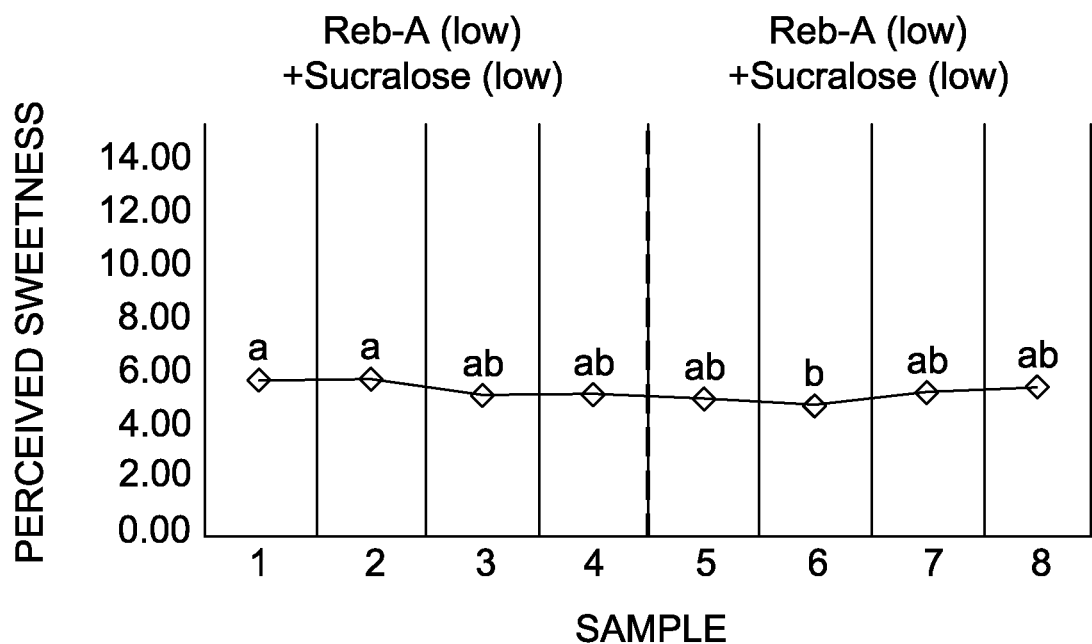
FIG. 13 is a graph showing the sweetness intensity of a solution comprising a low concentration of Reb A and a low concentration of sucralose over 8 samples, as described in Example 4.

Effect of Sweetener Blends:

FIG. 13 shows the change in sweetness perception for a blend of Reb A and sucralose at a constant concentration. As can be seen from this figure, there was no significant change in sweetness perception (no adaptation) over the 8 samples for the blend of low concentration Reb A solution and low concentration sucrose solution.

These results suggest that sweetener adaptation might be avoided if two high potency sweeteners that do not demonstrate cross-adaptation are administered concurrently. In the case of Reb A and sucralose, the low concentration blend of these two sweeteners did not demonstrate adaptation, even though adaptation was observed for Reb A and sucralose when taken individually (see, e.g., FIGS. 2 and 3). These results further suggest that adaptation can be minimized or avoided, and a relatively constant sweetness perception may be achieved, by using a blend of high potency sweeteners that do not demonstrate cross-adaptation.

Example 13

The sweetness intensity over time of chewing gum comprising the sweetener combination of sucralose and Reb A was compared to that of chewing gum comprising sucralose and acesulfame-K (Ace-K).

Chewing gum was prepared according to the formulations set forth in Table 4. Both chewing gums had a coating comprising the sweetener Ace-K in the same concentration.

TABLE 4

| Ingredient | Example 13 | | Control | |
|---|---|---|---|---|
| | Weight % | Weight (g) | Weight % | Weight (g) |
| Powder sorbitol | 46.23 | 463.19 | 47.49 | 47.493 |
| Gum base | 31.00 | 310.00 | 31.00 | 31.00 |
| Calcium carbonate | 14.00 | 140.00 | 14.00 | 14.00 |
| Glycerol | 3.75 | 37.50 | 3.75 | 3.75 |
| Flavor | 2.72 | 27.16 | 2.72 | 2.716 |
| Sucralose | 0.14 | 1.40 | 0.19 | 0.186 |
| Encapsulated sucralose | 0.38 | 3.75 | 0.38 | 0.375 |
| Encapsulated acesulfame-K | — | — | 0.48 | 0.480 |
| Reb A | 1.70 | 17.00 | — | — |
| Total | 100.00 | 1000.00 | 100.00 | 100.00 |

The sweetness intensity of the chewing gums over a 20 minute chew time was evaluated by trained panelists. The results are set forth in FIG. 14.

Figure 14:
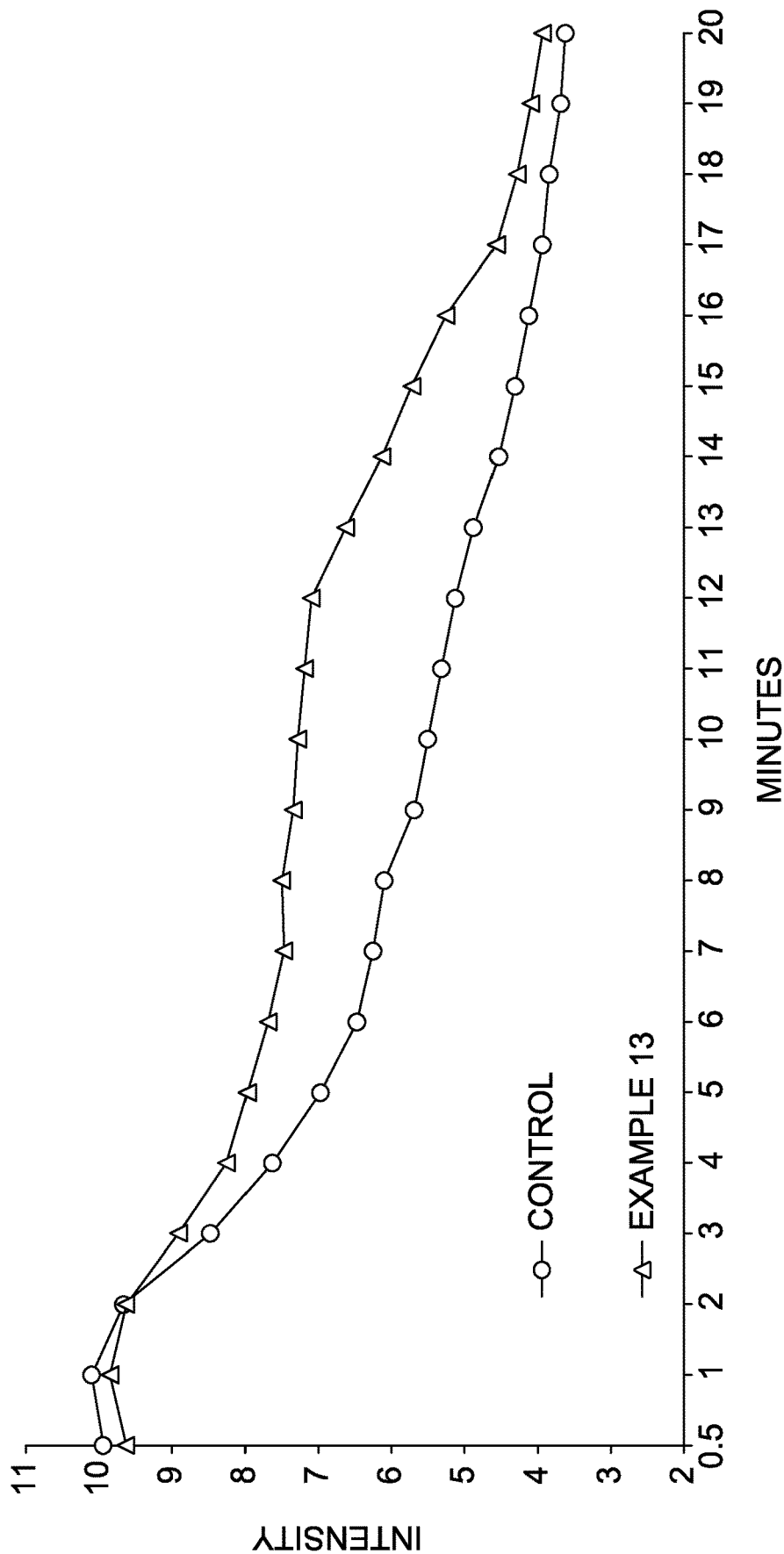
FIG. 14 is a graph comparing the sweetness intensity over time of a gum comprising sucralose plus Reb A to a gum comprising sucralose plus Ace-K, as described in Example 13.

As can be seen from FIG. 14, the gum comprising Reb A in combination with sucralose maintained a higher sweetness intensity over the time period tested, than did the gum comprising Ace-K in combination with sucralose. These results demonstrate the effectiveness of the combination of Reb A and sucralose in maintaining sweetness intensity of gum over an extended period of time.

Examples 14-16

The sweetness intensity over time of chewing gum comprising various sweetener combinations was evaluated.

Chewing gum was prepared according to the formulations set forth in Table 5.

TABLE 5

| Ingredient | Example 14 | | Example 15 | | Example 16 | |
|---|---|---|---|---|---|---|
| | Wt % | Wt (g) | Wt % | Wt (g) | Wt % | Wt (g) |
| Powder sorbitol | 36.85 | 442.24 | 36.69 | 440.24 | 37.01 | 444.12 |
| Gum base | 28 | 336 | 28 | 336 | 28 | 336 |
| Xylitol | 16.13 | 193.56 | 16.13 | 193.56 | 16.13 | 193.56 |
| Maltitol | 10.00 | 120.00 | 10.00 | 120.00 | 10.00 | 120.00 |
| Glycerol | 3.50 | 42.00 | 3.50 | 42.00 | 3.50 | 42.00 |
| Flavor | 2.63 | 31.56 | 2.63 | 31.56 | 2.63 | 31.56 |
| HSH glycerine blend | 1.50 | 18.00 | 1.50 | 18.00 | 1.50 | 18.00 |
| Blue speckles | 0.10 | 1.20 | 0.10 | 1.20 | 0.10 | 1.20 |
| Encapsulated Ace-K | — | — | — | — | 0.68 | 8.16 |
| Reb A | 0.85 | 10.20 | 0.85 | 10.20 | — | — |
| Encapsulated sucralose | 0.42 | 5.04 | 0.42 | 5.00 | — | — |
| Encapsulated saccharin | — | — | — | — | 0.42 | 5.04 |
| Sucralose | 0.02 | 0.20 | 0.19 | 2.23 | — | — |
| Saccharine | — | — | — | — | 0.03 | 0.36 |
| Total | 100.00 | 1200.00 | 100.00 | 1200.00 | 100.00 | 1200.00 |

HSH = hydrogenated starch hydrolysate

For comparison, a control gum composition comprising the sweetener combination of aspartame (0.33% by weight of the gum) and Ace-K (0.14% by weight of the gum) was also prepared. The sweetness intensity of the chewing gums over a 12 minute chew time was evaluated by trained panelists. The results are set forth in FIG. 15.

Figure 15:
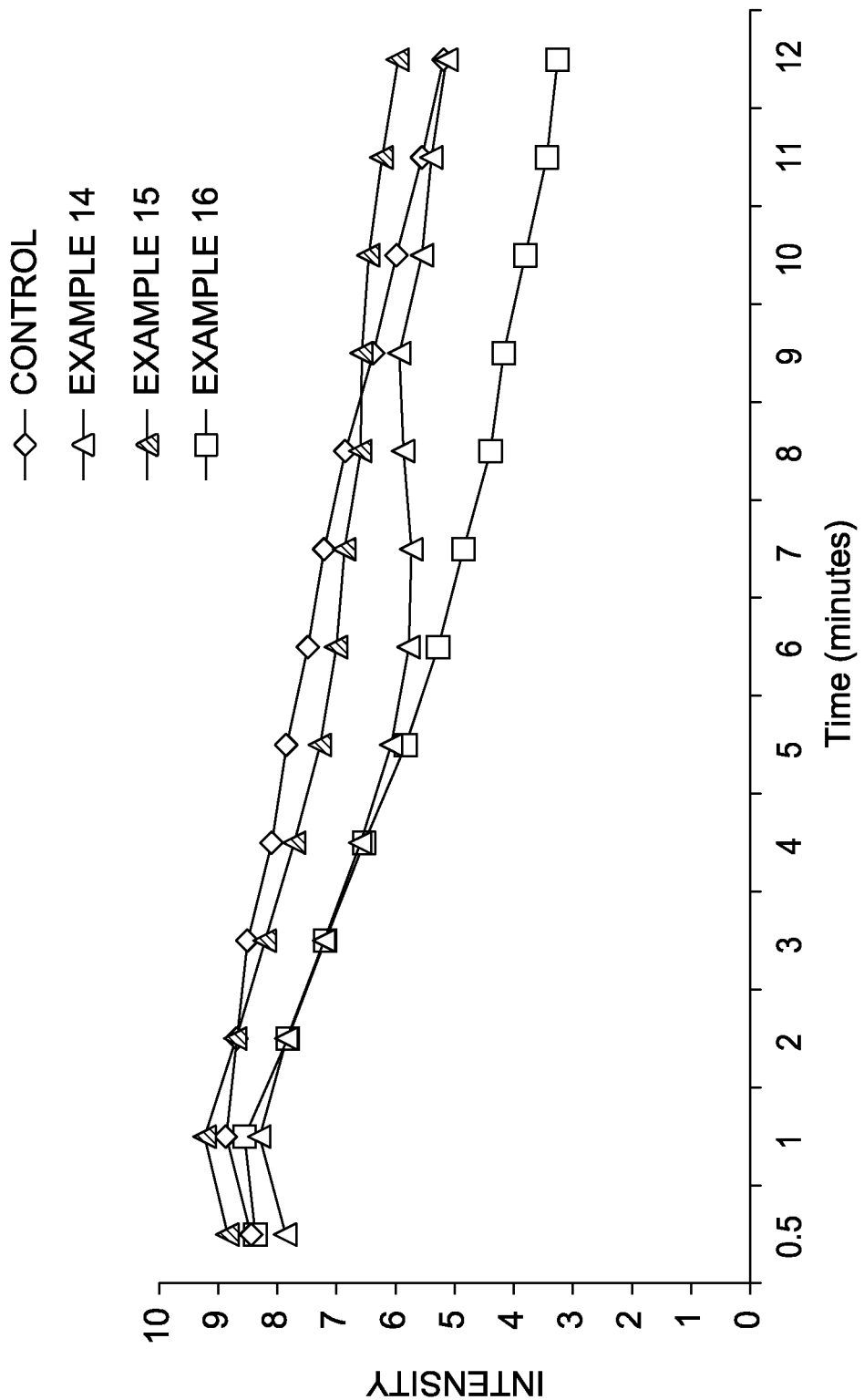
FIG. 15 is a graph comparing the sweetness intensity over time of four gums comprising various combinations of sweeteners, as described in Examples 14-16.

As can be seen from FIG. 15, both gums comprising the sweetener combination of Reb A and sucralose (Example 14 and 15 gums) had a more consistent sweetness intensity profile and a higher sweetness intensity after 12 minutes of chewing than did the gum comprising encapsulated Ace-K, encapsulated saccharine, and neat saccharine (Example 16 gum).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

With reference to the use of the words "comprise" or "comprises" or "comprising" in this patent application (including the claims), Applicants note that unless the context requires otherwise, those words are used on the basis and clear understanding that they are to be interpreted inclusively, rather than exclusively, and that Applicants intend each of those words to be so interpreted in construing this patent application, including the claims below. Furthermore, as used herein, reference to "a" or "an" means "one or more." Throughout, the plural and singular should be treated as interchangeable, other than the indication of number.

What is claimed is:

1. A chewing gum composition comprising:
   a chewing gum base;
   about 0.7% to about 0.85% by weight of a first sweetener having a first release profile, wherein the first sweetener is rebaudioside A; and
   about 0.02% to about 0.7% by weight of a second sweetener having a second release profile, wherein the second sweetener is sucralose;
   wherein the first sweetener and the second sweetener do not demonstrate cross-adaptation with each other; and
   wherein the first and second sweeteners are configured to be sequentially released.

2. The composition of claim 1, wherein the release of the first sweetener partially overlaps with the release of the second sweetener.

3. The composition of claim 1, wherein the first sweetener is released from the gum prior to the second sweetener.

4. The composition of claim 1, wherein the first sweetener is present in an amount of about 0.85% by weight of the chewing gum composition.

5. The composition of claim 1, wherein the second sweetener is released prior to the first sweetener.

6. A chewing gum composition comprising:
   a chewing gum base;
   about 0.7% to about 0.85% by weight of a first sweetener having a first release profile, wherein the first sweetener is rebaudioside A; and
   about 0.4% to about 0.7% by weight of a second sweetener having a second release profile, wherein the second sweetener is an encapsulated sucralose;
   wherein the first sweetener does not demonstrate cross-adaptation with the second sweetener; and
   wherein the first sweetener and the second sweetener are configured to be sequentially released.

7. The composition of claim 6, wherein the first sweetener is released from the gum prior to the second sweetener.

8. The composition of claim 7, wherein the release of the first sweetener partially overlaps with the release of the second sweetener.

9. The composition of claim 6, wherein the first sweetener is present in an amount of about 0.85% by weight of the chewing gum composition and second sweetener is present in an amount of between about 0.4% to about 0.5% by weight of the chewing gum composition.

10. The composition of claim 1, wherein the first sweetener and the second sweetener are configured to provide a consistent sweetness profile to the gum for at least 12 minutes of chewing.

\* \* \* \* \*